United States Patent
Kurata et al.

(10) Patent No.: US 6,800,236 B1
(45) Date of Patent: Oct. 5, 2004

(54) CRAWLER MOLDING METHOD (75) Inventors: Tomoyuki Kurata, Yokohama (JP); Yoichi Kumano, Yokohama (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/623,221

(22) PCT Filed: Mar. 3, 1999

(86) PCT No.: PCT/JP99/01000

§ 371 (c)(1),
(2), (4) Date: Aug. 30, 2000

(87) PCT Pub. No.: WO99/44800

PCT Pub. Date: Sep. 10, 1999

(30) Foreign Application Priority Data

Mar. 3, 1998 (JP) .......................................... 10-050580

(51) Int. Cl.⁷ .......................... B29C 33/02; B29C 35/02
(52) U.S. Cl. ...................... 264/326; 156/140; 425/34.2; 425/384; 425/395
(58) Field of Search ................................ 264/236, 326, 264/315, 347; 425/34.2, 384, 395, 335, 343; 156/137, 140, 141, 138

(56) References Cited

U.S. PATENT DOCUMENTS

| | | |
|---|---|---|
| 4,095,480 A | 6/1978 | Schwabauer |
| 4,263,083 A | 4/1981 | Schleiger |
| 4,867,661 A | 9/1989 | Natalevich et al. |
| 6,086,811 A * | 7/2000 | Fike ............................ 264/326 |

FOREIGN PATENT DOCUMENTS

| | | |
|---|---|---|
| CA | 2243259 | 7/1997 |
| JP | A-6-226769 | 8/1994 |
| JP | A-7-60869 | 3/1995 |
| JP | A-9-76369 | 3/1997 |
| JP | A-9-216228 | 8/1997 |
| JP | A-11-179731 | 7/1999 |

* cited by examiner

*Primary Examiner*—Mathieu D. Vargot
(74) *Attorney, Agent, or Firm*—Oliff & Berridge, PLC

(57) ABSTRACT

A molding method for a seamless crawler is provided in which the number of production steps is few, embedding of spiral reinforcement cords and a circumferentially uniform strength property are made possible, high-speed traveling can be accommodated, and a uniform, reliable pressure for an outer mold is enabled. The crawler molding method is structured such that a crawler 10 is integrally molded and vulcanized between an endless ring-shaped outer mold 12 and an inner mold 22. After structural components of the crawler 10 are molded at an outer periphery of the inner mold 22 which is dividable in an axial direction, the outer mold 12 which is divided in a circumferential direction and is slidable in a radial direction is disposed at an outer side an the structural components of the crawler 10. The outer mold 12 is contracted in the radial direction by pressure applied thereto. Accordingly, the structural components of the crawler 10 are vulcanized.

19 Claims, 10 Drawing Sheets

FIG.3B (VIEW FROM THE DIRECTION OF ARROW A)

FIG. 4

(VIEW FROM THE DIRECTION OF ARROW B)

CRAWLER MOLDING METHOD

BACKGROUND OF THE INVENTION

1. Technical Field

The present invention relates to a molding method for an endless crawler which is mounted and used on a construction vehicle or a high-speed snowfield vehicle such as an RV or the like.

2. Background Art

In recent years, the number of cases has risen in which ordinary driving wheels on a leisure RV vehicle are removed and a crawler driver formed of a plurality of sprockets and rotation wheels is mounted in order for the vehicle to be used as a snowfield vehicle or the like. A crawler structured of an endless rubber belt and the like is mounted on the crawler driver. However, the need to accommodate a trend in higher traveling speed has been a prime concern attendant with mounting a crawler on an RV vehicle. Further, accommodating the crawler to a higher traveling speed has been a pressing concern not only with ordinary snowfield vehicles and the like but with construction vehicles on which rubber crawlers which reduce noise and vibration have come to be mounted.

Figure 9A:
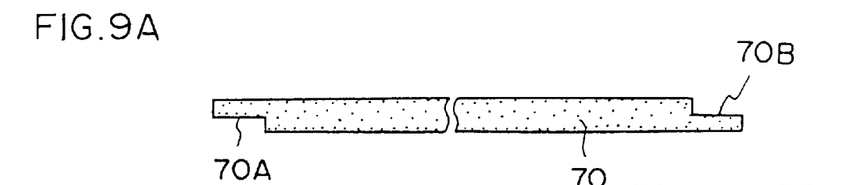
FIG. 9A is a side view of a crawler.
Figure 10A:
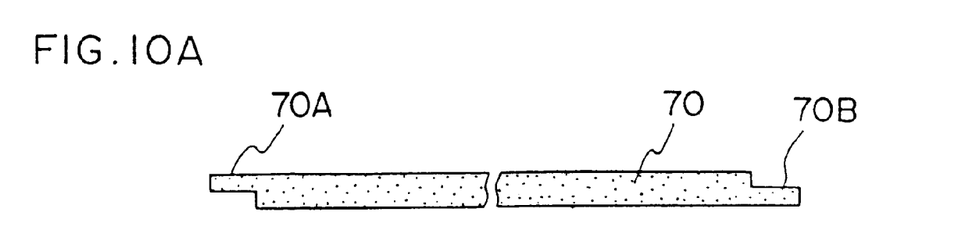
FIG. 10A is a side view of a crawler.
Figure 10B:
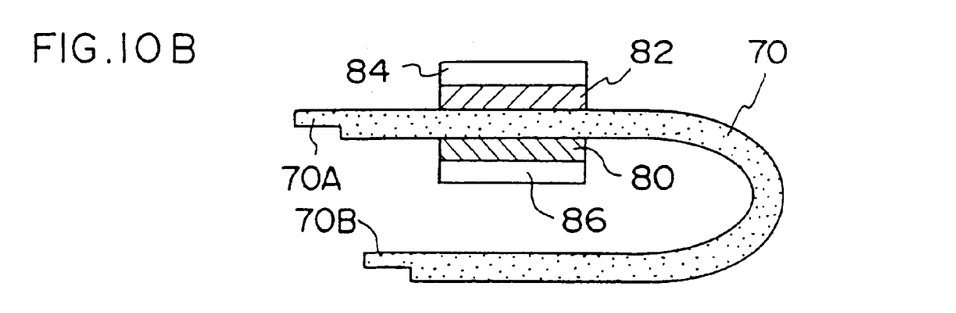
FIG. 10B is a side view which illustrates a state in which the crawler is vulcanized.
Figure 10C:
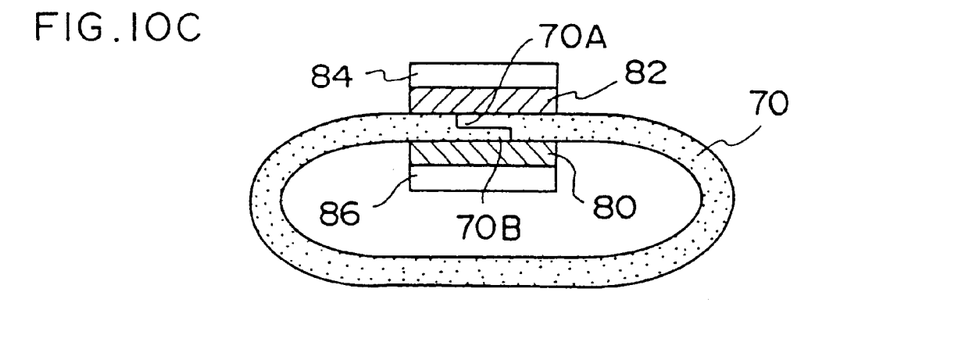
FIG. 10C is a side view which illustrates a state in which both ends of the crawler are vulcanized and joined.

Generally, a crawler mounted on the crawler driver is molded and vulcanized according to such methods as those illustrated in FIGS. 9A and 10C.

Figure 9B:
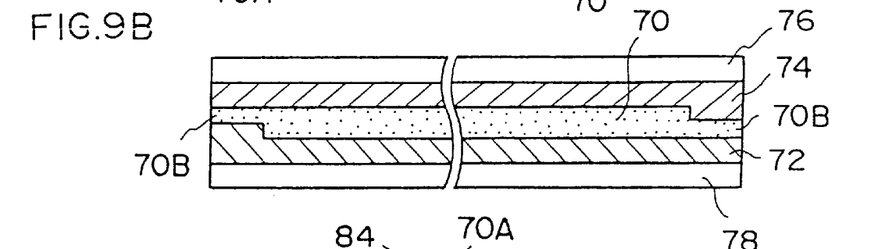
FIG. 9B is a side view which illustrates a state in which the crawler is vulcanized.
Figure 9C:
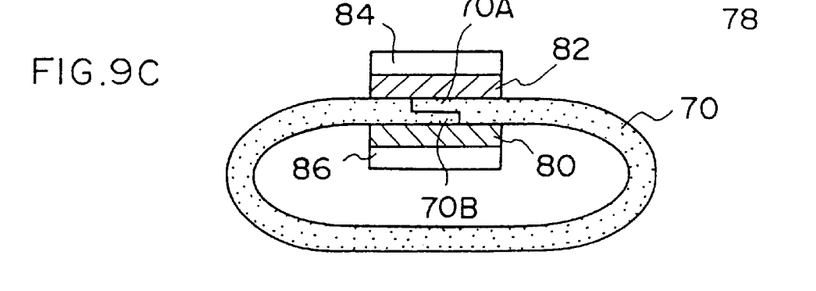
FIG. 9C is a side view which illustrates a state in which both ends of the crawler are vulcanized and joined.

FIGS. 9A to 9C illustrate a basic production method. A crawler 70 illustrated in FIG. 9A, which is formed of a belt-shaped rubber and the like in which reinforcing cords (not illustrated) are embedded, is nipped by an upper mold 74 and a lower mold 72, as illustrated in FIG. 9B. The upper and lower molds are further nipped by an outer heating plate 76 and an inner heating plate 78 to vulcanize the crawler 70 by heating. Thereafter, as illustrated in FIG. 9C, staggered end portions 70A and 70B of the crawler 70 are overlapped with each other, and then both end portions are vulcanized and joined by a lower mold 80 and an upper mold 82 and by an outer heating plate 84 and an inner heating plate 86 to obtain an endless crawler product.

FIGS. 10A to 10C illustrate a production method known as feed vulcanization which is used when vulcanizing a comparatively lengthy crawler. A crawler 70 illustrated in FIG. 10A, which is formed of a lengthy belt-shaped rubber and the like in which reinforcing cords (not illustrated) are embedded, is nipped by a lower mold 80 and an upper mold 82, as illustrated in FIG. 10B. The lower mold 80 and the upper mold 82 are of a relatively short predetermined length, and are further nipped by an outer heating plate 84 and an inner heating plate 86 which vulcanize a predetermined length portion of the crawler 70 by heating. This is sequentially repeated so that the entire length of the crawler 70 is vulcanized. Thereafter, as illustrated in FIG. 10C, staggered end portions 70A and 70B of the crawler 70 are overlapped with each other, and then both end portions are vulcanized and joined by the lower mold 80 and the upper mold 82 and by the outer heating plate 84 and the inner heating plate 86 to obtain an endless crawler product.

PROBLEMS TO BE SOLVED BY THE INVENTION

However, the production process for crawlers molded in accordance with such conventional vulcanization methods requires an excessive amount of time because the molding of the crawlers is conducted in advance in separate processes before entering the vulcanization process.

The vulcanization method illustrated in FIG. 9 requires not only a setting site with a large amount of space because the mold and the heating plate become longer and larger, but also requires a joining-vulcanization process just for the ends.

The vulcanization method illustrated in FIGS. 10A to 10C requires that vulcanization be repeated from a few times to as many as ten times for each predetermined length even though the mold and the heating plate are compacted. In addition, this method requires an excessive amount of time for vulcanization and, similar to the vulcanization method illustrated in FIGS. 9A to 9C, a joining-vulcanization process just for the ends.

Moreover, in these production methods which use vulcanization, it is impossible to endow the endless ring-shaped crawler belt with uniform properties at every point on the circumference of the crawler, since both longitudinal end portions of the belt-shaped crawler must be vulcanized and joined. Further, the process of connecting respective, paired end portions of reinforcement cords which are plurally provided in a row in the lengthwise direction of the crawler and embedded therein is burdensome. With regard to reinforcement strength, there has also been the fear that the continuity might be severed, not to mention the impossibility of embedding spiral reinforcement cords that could make a circumferentially uniform reinforcement strength possible.

Conventional production methods which employ vulcanization have thus been unable to accommodate the rotation of the crawler at a high speed accompanying a higher vehicle speed.

SUMMARY OF THE INVENTION

Therefore, the present applicants proposed a crawler molding method (see JP-A No. 9-76369) and a crawler molding device and a molding method thereof (Japanese Patent Application No. 9-355208) so as to solve the problems described above in conventional molding and vulcanization methods. The crawler molding device and molding method thereof disclosed in Japanese Patent Application No. 9-355208 relate to an inner mold and release of the inner mold. In the seamless crawler molding method disclosed in JP-A No. 9-76369, the number of production steps is few, endowing the crawler with a circumferentially uniform strength property is made possible, and the embedding of spiral reinforcement cords in the rubber crawler and the like which can accommodate high-speed traveling is made possible.

An object of the present invention is to mold a seamless crawler which improves upon the proposed crawler molding device and molding method mentioned above, and in which the number of production steps is few, embedding of spiral reinforcement cords and a circumferentially uniform strength property are made possible, which can further accommodate high-speed traveling, which enables a uniform, reliable outer mold pressure, and in which a seamless crawler can be molded only by adding or removing a portion of the mold, even for crawlers whose circumferential lengths are different.

Means for Solving the Problems

The invention provides a crawler molding method, in which structural components of a crawler are placed between an outer mold and an inner mold to form an endless shape and vulcanized to integrally mold a crawler, comprising: disposing the structural components of the crawler on an outer peripheral surface of an inner mold, which inner mold is dividable in the axial direction of the crawler; and thereafter radially contracting and pressurizing toward the inner mold by a radially contracting means a diameter of a circle defined by a plurality of outer molds which are divided and disposed along the outer peripheral surface of the inner mold, whereby the structural components of the crawler are integrally vulcanized.

The invention provides a crawler molding space which is formed by an outer peripheral surface of the inner mold and an inner peripheral surface defined by the plurality of outer molds is circular from a side view.

The invention provides the inner mold is structured by two semi-circular inner molds and by a plurality of square inner molds which are disposed between the semi-circular inner molds and which allow the outer peripheral surfaces thereof to be continued; and the outer mold is structured by a plurality of circular arc-shaped outer molds to form a crawler molding space between the outer molds and the semi-circular inner molds, the crawler molding space being semi-circular from a side view, and by a plurality of square outer molds to form a linear crawler molding space between the outer molds and the square inner molds.

The invention provides a length of the square outer molds is determined by a crawler pitch such as an interval between driving sprocket holes of the crawler or the embedded metals, and a number of square outer molds to be used is determined by a circumferential length of the crawler.

The invention further provides the radially contracting means is formed by a radially contractible inner frame in which an inclined surface which is disposed on an inner peripheral surface side of the outer mold and which inclines in the width direction of the crawler is formed on an outer peripheral surface of the inner frame, and an outer frame in which an inclined surface which slides along the inclined surface formed on the outer peripheral surface of the inner frame is formed on an inner peripheral surface of the outer frame; and the structural components of the crawler are integrally vulcanized by moving the outer frame in the width direction of the crawler to radially contract and pressurize the inner frame and the outer molds.

The invention provides a press plate for pressing the outer frame in the width direction of the crawler.

The invention further provides the radially contracting means is structured by inclined surfaces formed on both end portions of the outer mold in the width direction and by an outer frame which is disposed on both sides of the outer mold and in which inclined surfaces which slide along the inclined surfaces formed on the both end portions of the outer mold is formed on an inner peripheral portion of the outer frame, and the outer frame is moved toward the outer mold from the both sides, so that the outer mold is radially contracted and pressurized to integrally vulcanize the structural components of the crawler.

The invention provides at the time that the inner molds are divided in the width direction of the crawler and the crawler is released, an outer peripheral portion of the crawler is gripped by a gripping means.

The invention further provides the gripping means is a gripping member which is driven by a gripping cylinder and which grips an outer peripheral portion of the crawler between the inner mold and the gripping member.

The invention provides the inner mold is rotated, and a reinforcement cord which is fed from a wire feeder to an outer peripheral surface of the inner mold is wound.

The invention further provides the inner mold is mounted on a mold chuck which is rotatably driven by a motor.

The invention further provides the inner mold is mounted on a mold release driver which moves relative to rails.

The invention further provides the mold release driver is driven by a cylinder.

The invention provides reinforcing wires are coiled as a single reinforcement cord in a spiral configuration to an embedding site on the crawler at a predetermined pitch while being twisted together from the wire feeder.

The invention further provides a reinforcement cord formed by the wires which have been twisted together in advance is fed from a wire feeder in a spiral configuration.

The invention further provides a reinforcement cord which has been coated with rubber is fed from a wire feeder in a spiral configuration.

The invention provides a canvas-configured body, in which a plurality of reinforcing cords is mounted in one of a row and at an incline at a predetermined bias angle, is fed from the wire feeder.

The invention provides the inner mold is divided in three at a center and both sides of the center.

The invention provides a tread pattern of a tracking surface of the crawler is defined by an inner peripheral surface of the outer molds.

The invention further provides the inner mold and the outer mold are heated as heating plates.

Effects of the Invention

As stated in detail above, in accordance with the present invention, the structural components of the crawler are molded at the outer periphery of the inner mold which is dividable in the axial direction. Thereafter, the outer mold which is divided in the circumferential direction and slidable in the radial direction is disposed at the outer side of the structural components of the crawler. The outer mold is radially contracted by a pressure applied thereto, whereby the structural components of the crawler are vulcanized. Therefore, when the structural components of the crawler are molded at the outer periphery of the inner mold, it becomes possible to embed a reinforcement cord in a spiral configuration by using a wire feeder. In addition, between an endless ring-shaped outer mold and inner mold, the structural components of a crawler can be pressurized uniformly and reliably at a circumference by a plurality of outer molds. Molding and vulcanization are simultaneously carried out, and mold release is rapid. Thus, it becomes possible to sharply reduce the amount of work time.

Further, the outer periphery of the outer mold is made into an inclined surface which inclines in the axial direction. An outer frame, on which an inclined surface which corresponds with the inclined surface at the outer periphery of the outer mold and which is provided at the inner periphery of the outer frame, is disposed at the outer side of the outer mold. The outer mold is radially contracted by pressure applied thereto from a movement of the outer frame in the axial direction. Therefore, when structured so that the structural components of a crawler are vulcanized in this way, linear movement of the outer frame in the axial direction which is relatively easy to control can be converted to the contraction of a plurality of outer molds in the radial direction, through the inclined surface, which outer molds are divided in the circumferential direction when the molding and vulcanization are carried out. Uniform and reliable pressure can thereby be applied to the endless ring-shaped crawler at the circumference. Thus, a crawler having uniform properties at every point on the circumference can be manufactured.

Further, when the outer mold is structured such that the mold portions which come into direct contact with the structural components of the crawler and inner frame portions at the outer periphery thereof are separate bodies, the inner frame can be selected to a material suitable for sliding with the outer frame along the inclined surface, and the outer mold can be selected to a material suitable for vulcanization. Thus, freedom of choice in the design stage in selecting materials can be increased.

A molding method for a seamless crawler is provided in which the number of production steps is few, embedding of spiral reinforcement cords and a circumferentially uniform strength property on the circumference of the crawler are made possible, high-speed traveling can be accommodated, and a uniform, reliable pressure for an outer mold is enabled. Unlike conventional crawler molding methods, there is no need to be troubled with joining processes for paired end portions of reinforcement cords which are plurally provided in a row and embedded. Continuity with respect to reinforcement strength is maintained. By securing a stable reinforcement strength, stability of the crawler at high-speed traveling can be improved and long life is ensured.

In addition, the number of square inner molds and outer molds can be selected in accordance with the circumferential length of the crawler to be formed, so that a variety of crawlers having different circumferential lengths can be integrally vulcanized and molded at a low cost by using in common the front and rear semicircular inner molds without changing thereof.

BRIEF DESCRIPTION OF THE DRAWINGS

FIGS. 2A and 2B are views which illustrate the crawler molding method in accordance with the first embodiment of the present invention.

FIGS. 3A and 3B are views which illustrate the crawler molding method in accordance with the first embodiment of the present invention.

FIGS. 6A and 6B are explanatory views which illustrate a crawler molding method according to a second embodiment of the present invention.

FIGS. 7A and 7B are explanatory views which illustrate a crawler molding method according to a third embodiment of the present invention.

FIGS. 9A to 9C are explanatory views which illustrate a first example of a conventional crawler molding method.

FIGS. 10A to 10C are explanatory views which illustrate a second example of a conventional crawler molding method.

DETAILED DESCRIPTION OF PREFERRED EMBODIMENT

Embodiments according to the present invention will hereinafter be described in detail on the basis of drawings.

Figure 1A:
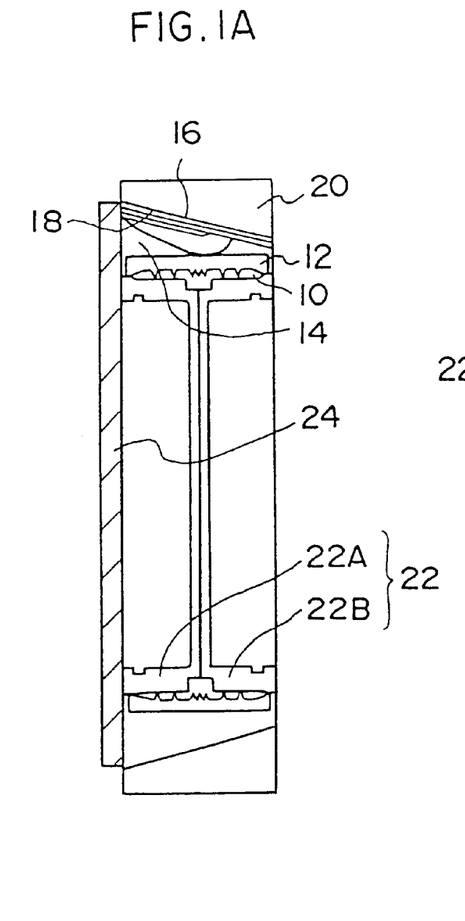
FIG. 1A is a view which illustrates a crawler molding method in accordance with a first embodiment of the present invention, and is a schematic sectional side view of a vulcanization process which illustrates a state in which a diameter of an outer mold has been contracted.
Figure 2A:
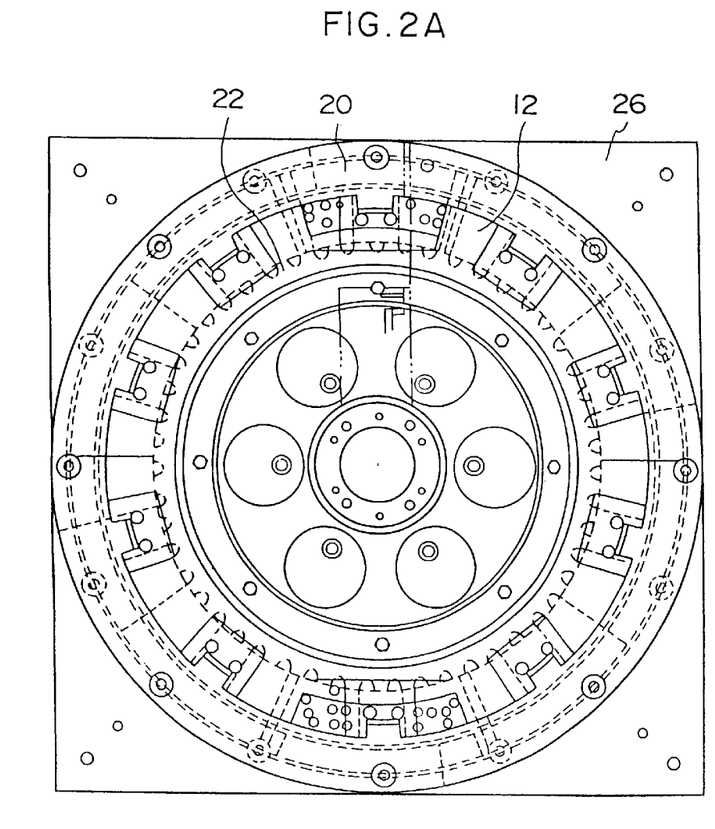
FIG. 2A is a front view which illustrates the details of FIGS. 1A and 1B.
Figure 2B:
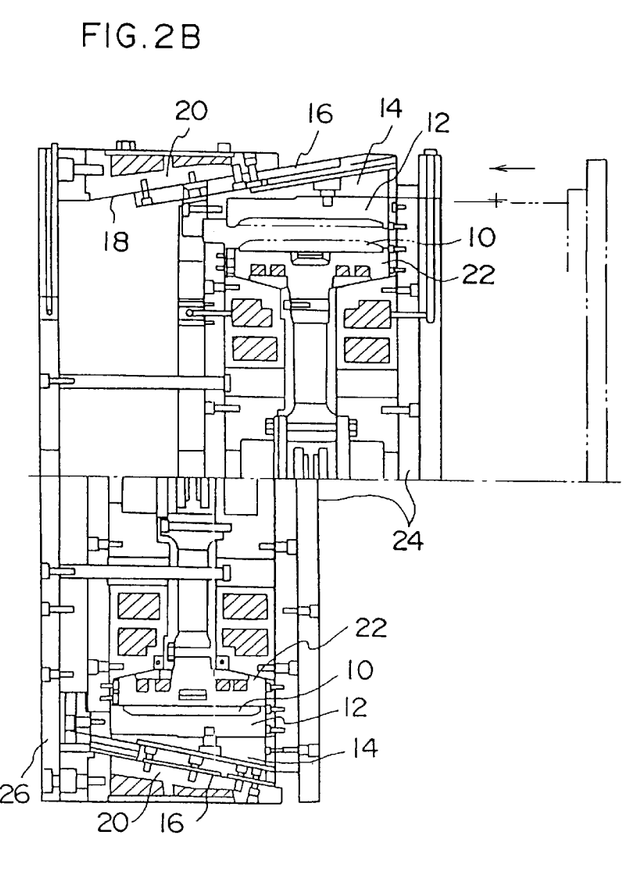
FIG. 2B is a sectional side view which illustrates the details of FIGS. 1A and 1B.
Figure 3A:
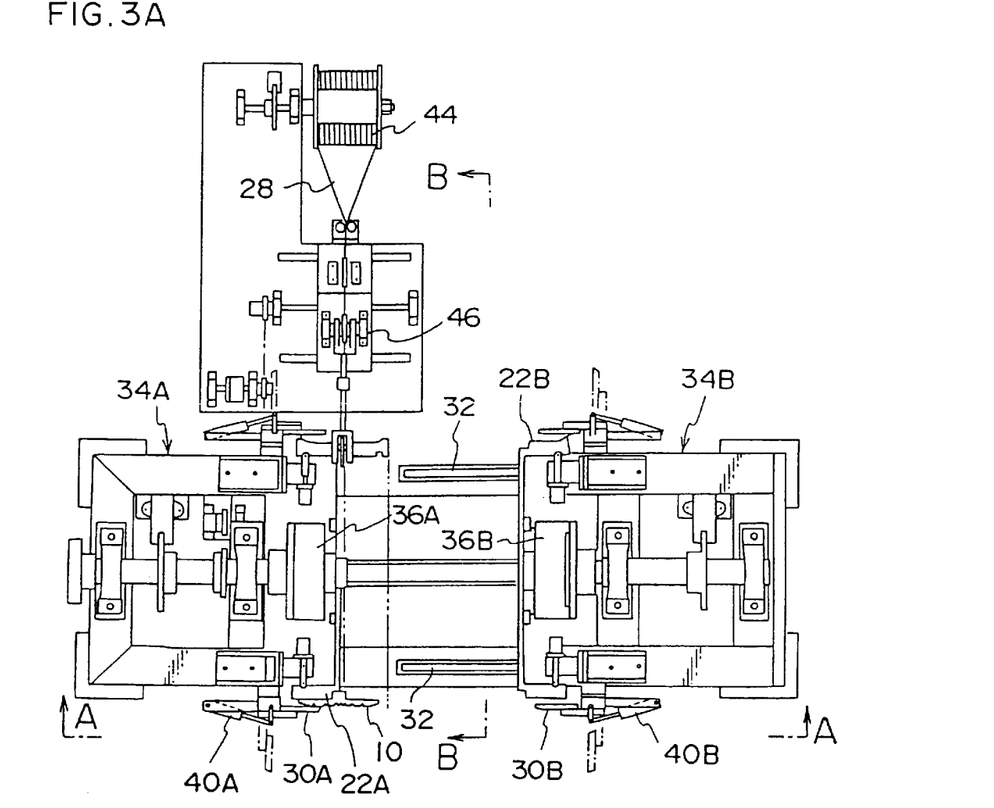
FIG. 3A is a plan view which illustrates an overall crawler molding device.
Figure 3B:
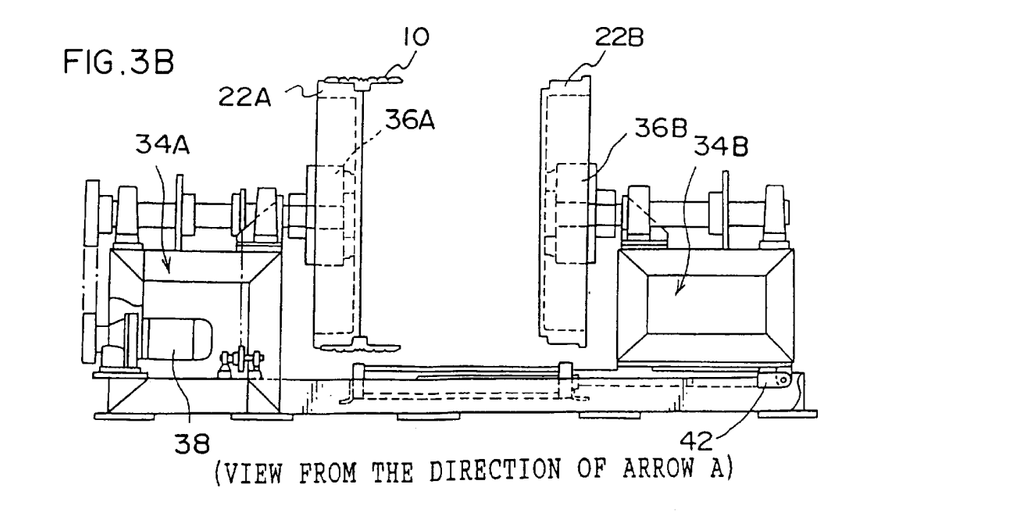
FIG. 3B is a front view which illustrates the crawler molding device.
Figure 4:
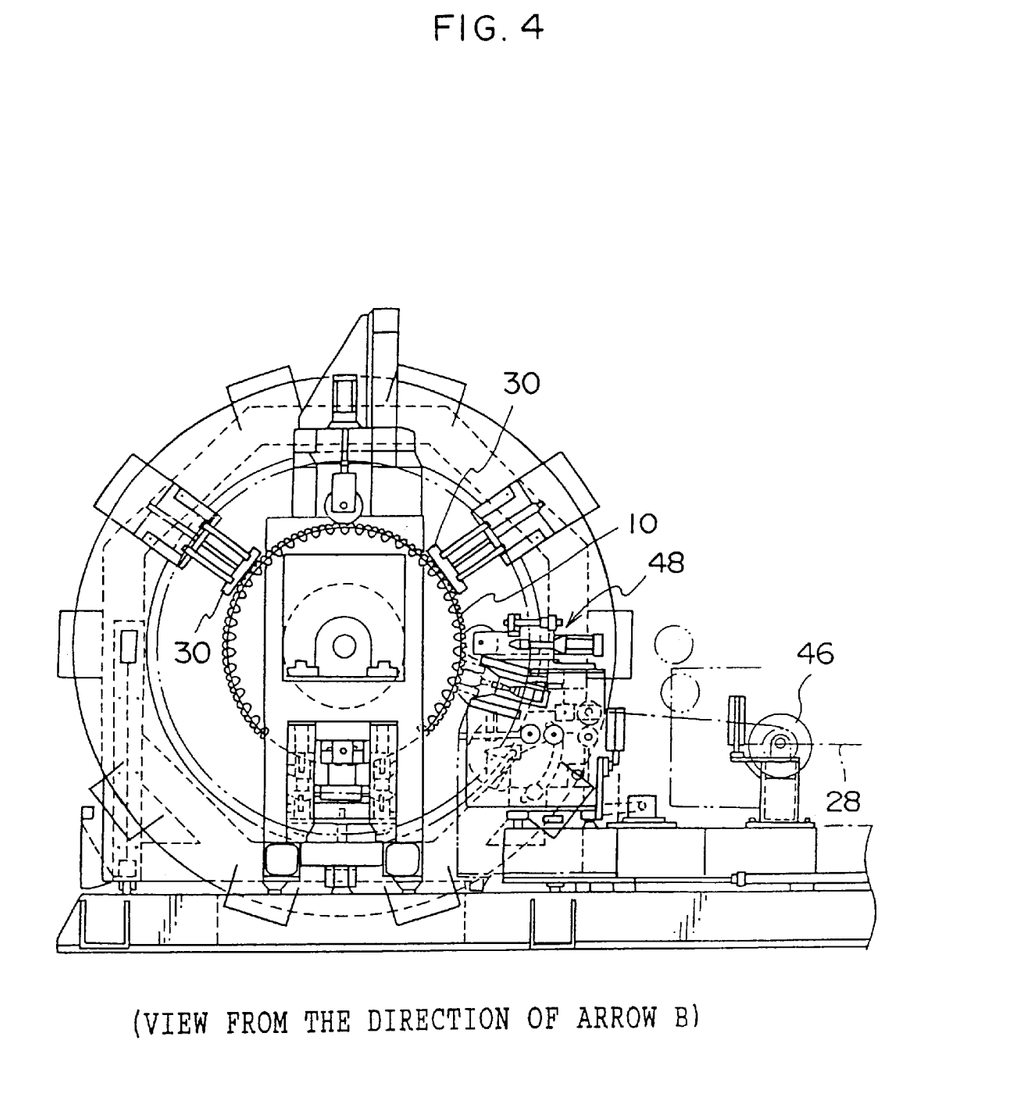
FIG. 4 is a view which illustrates the crawler molding method according to the first embodiment of the present invention, and is a side view of the overall crawler molding device.

FIGS. 1A through 4 are drawings which illustrate a crawler molding method in accordance with a first embodiment of the present invention. FIGS. 1A and 1B are schematic side sectional views which illustrate a vulcanization process, particularly by the movement of an outer mold. FIGS. 2A and 2B are front views and a side sectional view which illustrate the details of the vulcanization process seen from the opposite side. FIGS. 3A and 3B are plan views and a front view which illustrate an overall crawler molding device. FIG. 4 is a side view which illustrates the overall crawler molding device.

Figure 1B:
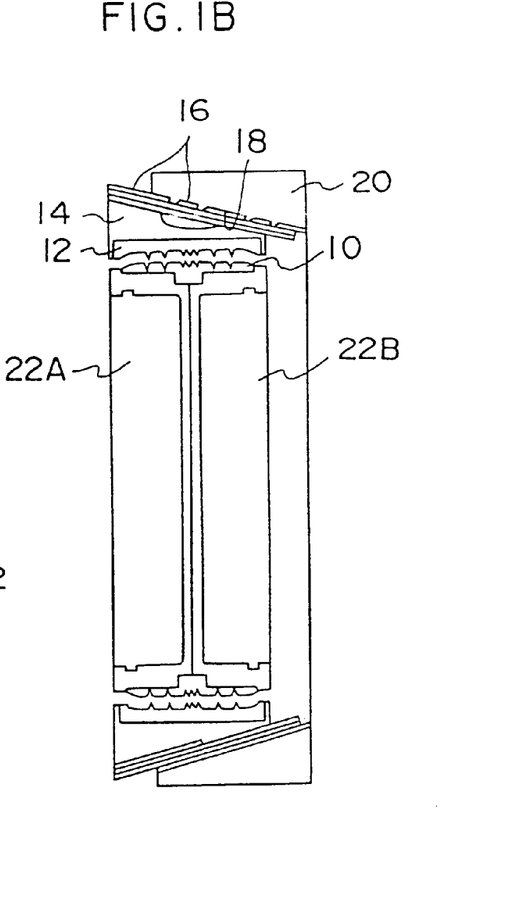
FIG. 1B is a view which illustrates the crawler molding method in accordance with the first embodiment of the present invention, and is a schematic sectional side elevation of a vulcanization process which illustrates a state in which an outer mold has been released.
Figure 5:
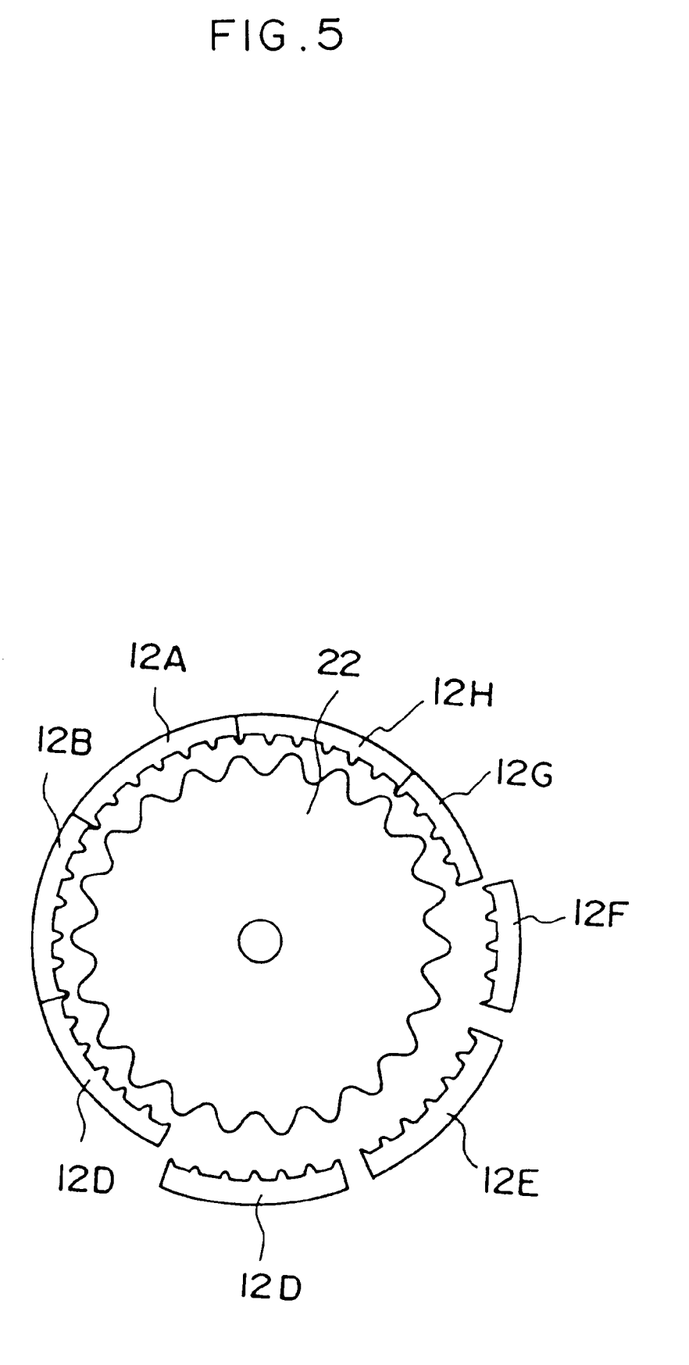
FIG. 5 is a view which illustrates the crawler molding method according to the first embodiment of the present invention, and is a schematic view illustrating the relationship between an inner mold and an outer mold of the crawler molding device.

As illustrated in FIGS. 1A and 1B, an outer mold 12, which defines a tread pattern of a tracking surface of a crawler 10 which is vulcanized and molded, is disposed on an inner peripheral side of a contractible inner frame 14. As illustrated in FIG. 5 which will be described below, the outer mold 12 is composed of a plurality of pieces 12A to 12H which are divided in a circumferential direction. The inner frame 14 is fit together so as to be movable in the axial direction and in the radial direction with respect to an inner peripheral inclined surface 18 of an outer frame 20 via a tapered inclined surface 16 of an outer periphery of the inner frame 14. In the present embodiment, because the outer mold 12 and the inner frame 14 are structured as separate bodies, the inner frame 14 can be selected to a material suited to the sliding with respect to the outer frame 20 in the inclined surface 16, and the outer mold 12 can be selected to a material suitable for vulcanization.

The outer mold 12, the inner frame 14, and the outer frame 20 are all formed in an endless ring configuration when viewed from the front. The configuration is preferably circular, but an appropriate shape such as an ellipse may also be adopted.

As illustrated in FIG. 2A and FIG. 5, an inner mold 22 for defining an inner peripheral surface of the crawler 10, which has projections which mesh with sprockets or the like, is formed facing the outer mold 12 in an endless ring configuration when viewed from the front. As illustrated in FIGS. 1A and 1B, the inner mold 22 is divided in two (22A and 22B) in the axial direction at a central position of the axial direction (i.e., the width direction of the crawler 10).

The reference numeral 24 in FIG. 1A indicates a press plate for the purpose of maintaining at regular positions the positional relationships of the inner frame 14, the outer frame 20 and the inner mold 22, and the outer mold 12, while at the same time pressing the outer mold 12 and the inner frame 14 in the axial direction at the time that the crawler 10 is molded and vulcanized.

In FIG. 2B, a state is illustrated in which the press plate 24 is pressing in the axial direction the outer mold 12 and the inner frame 14 from the right side in the drawing. As illustrated in FIG. 2B, the outer frame 20, which is provided at the outer periphery of the inner frame 14 via the inclined surface 16, is fixedly disposed on a base plate 26. As illustrated in FIG. 2B, the press plate 24 is pressed in the axial direction into close proximity with the base plate 26. Therefore, as illustrated in FIG. 5, the divided, respective pieces 12A to 12H of the outer mold 12 are radially contracted together with the inner frame 14 as the pieces move in the axial direction, whereby the structural components of the crawler which are mounted on the outer periphery of the inner mold 22 are uniformly and reliably pressured by the respective pieces 12A to 12H.

Figure 6A:
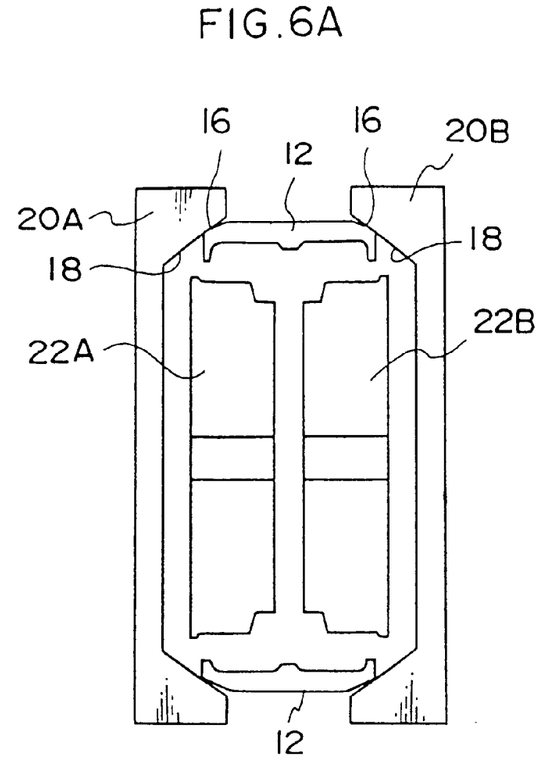
FIG. 6A is a schematic side sectional view.
Figure 6B:
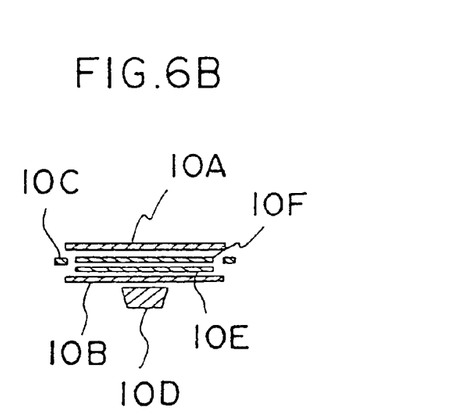
FIG. 6B is a layout view of structural components of a crawler.

When the outer mold 12 at the stage shown in FIG. 1B and FIG. 2B is in an unmounted state, a lug rubber 10A which forms a tracking portion, an inner periphery rubber 10B which forms an inner periphery side, a side rubber 10C which forms a side portion, a projecting rubber 10D which forms a guide for the sprocket, a reinforcing bias cord 10F, and a main cord 10E, which are structural components of the crawler 10, are placed on the outer periphery of the inner mold 22, as illustrated in FIG. 6B, and are vulcanized by a radial contraction pressure of the outer mold 12. After the projecting rubber 10D and the inner periphery rubber 10B have been placed on the outer circumference of the inner mold 22, a wire (see reference numeral 28 in FIGS. 3A, 3B and 4 which will be described below) for use as a reinforcing cord which structures the main cord 10E is coiled in a spiral configuration. Thereafter, the structural components of the crawler are molded, and in a state as shown in FIG. 1A the inner mold 22 and the outer mold 12 are heated as heating plates. Accordingly, the crawler 10 is molded and vulcanized between the inner mold 22 and the outer mold 12 at the same time.

Next, as illustrated in FIG. 1B, the inner frame 14 is moved in the axial direction with respect to the outer frame 20, whereby the inner frame 14 which installs the outer mold 12 expands outwardly in the radial direction such that the outer mold 12 can be released from the outer peripheral surface of the crawler 10.

Thereafter, in a state in which one of the right and left of the inner mold 22 (e.g., the right-side inner mold 22B) on the inner periphery is intervened, the outer peripheral surface of one side (right side) of the crawler 10 is gripped by a gripping member 30B (see FIG. 3A) and the inner mold 22A of the other side (left side) is released in the axial direction.

Similarly, in a state in which the inner mold 22A of the other side (left side) which has been slightly released in the axial direction is intervened, the outer peripheral surface of the other side (left side) of the crawler is gripped by a gripping member 30A and the inner mold 22B of the one side (right side) is released.

In this manner, when the inner mold which is divided in two is released in the axial direction, in a state in which one of the divided inner molds is intervened on the inner periphery of the crawler, the outer peripheral surface at the same side of the crawler can be reliably gripped by the gripping members 30. Therefore, each of the divided inner molds can be smoothly released.

FIGS. 3A, 3B and 4 illustrate an overall crawler molding device. As illustrated in FIG. 3A, the pair of left and right inner molds 22A and 22B which are divided in the axial direction are each gripped by left and right mold chucks 36A and 36B which are rotatably axially supported on a pair of left and right release drivers 34A and 34B, which each are movable in the axial direction along rails 32 on a base. As illustrated in FIG. 3B, the mold chucks 36A and 36B are rotatably driven by a main motor 38.

Left and right gripping members 30A and 30B are provided on the left and right release drivers 34A and 34B. The left and right gripping members 30A and 30B grip the outer peripheral surface of the vulcanized crawler 10 by the extension of left and right gripping cylinders 40A and 40B. In FIG. 3B, the reference numeral 42 indicates a shift cylinder which alters the relative positions of the left and right release drivers 34A and 34B.

On the outer periphery of the inner molds 22A and 22B which are gripped by both of the left and right mold chucks 36A and 36B which are rotated by the driving force of the main motor 38, the wire 28 which forms the reinforcement cord to be embedded, as illustrated in FIG. 3A, is fed to the crawler 10 to be molded in a direction tangential to the crawler 10. A plurality of wires 28 is fed from a wire drum 44, twisted together as a single cord by a pitch feed device 46, and the cord is coiled in a spiral configuration at a predetermined pitch to an embedding site of the crawler 10. Thereafter, the rubber which is to become the tread portion of the crawler 10 is coiled around the outer periphery of the reinforcement cord layer and molded.

FIG. 4 illustrates this aspect clearly. The reinforcement cord which is fed from the pitch feed device 46 is placed and mounted in a direction tangential to the crawler 10 at a predetermined pitch by a wire setting device 48.

As the reinforcement cord which is fed in a direction tangential to the crawler 10, a single reinforcement cord which has been formed by twisting wires together in advance may be supplied in a spiral configuration, or a single rubber-coated reinforcement cord which has been coated with rubber may be supplied in a spiral configuration. Further, as the reinforcement cord which forms the breaker and the like, a canvas-configured body approximately equal to the width of the crawler 10, on which a plurality of reinforcement cords has been provided in a row or slantingly provided at a predetermined bias angle, may be supplied. A rubber-coated reinforcement cord of the aforementioned canvas-configured body, which reinforcement cord has been coated with rubber, may also be supplied. In addition, as the material which constitutes the reinforcement cord, not only steel but nylon, Kevlar (registered trademark) and the like can be adopted.

In accordance with a crawler molding device having such a structure, vulcanization of the state illustrated in FIG. 1A is conducted after embedding of the cord and molding of the crawler 10 at previous steps prior to the state illustrated in FIG. 1A is conducted. Next, when the inner frame 14, the outer frame 20 and the outer mold 12 have been released as illustrated in FIG. 1B, the gripping cylinder 40B in the right-side release driver 34B is extended, and the outer periphery of the crawler 10 is gripped by the gripping member 30B. The left and right release drivers 34A and 34B are separated by a slight extension of the shift cylinder 42, whereby the left inner mold 22A can be slightly released in the axial direction.

Next, in a state in which the left inner mold 22A which has been slightly released is intervened at the inner side, the gripping cylinder 40A in the left release driver 34A is extended, thus making the gripping member 30A grip the outer periphery of the crawler 10. The shift cylinder 42 is extended and the left and right release drivers 34A and 34B are separated. Accordingly, the release of the pair of inner molds 22A and 22B from the inner peripheral surface of the crawler 10 can be completed.

FIGS. 6A and 6B illustrate a second embodiment of the crawler molding method of the present invention. In this embodiment, outer frames 20A and 20B are directly disposed at the outer periphery of the outer mold 12.

Accordingly, in this embodiment, inclined surfaces 16 are provided at the outer periphery of both edge end surfaces in the axial direction of respective divided pieces 12A to 12H in the outer mold 12. Further, a pair of left and right outer frames 20A and 20B is provided at the outer peripheral side of the respective divided pieces 12A to 12H. Inclined surfaces 18, which correspond with the inclined surfaces 16 of the outer mold 12, are formed at the respective inner peripheries of the outer frames 20A and 20B. In accordance with a proximal movement of the outer frames 20A and 20B in the axial direction, the diameter of a substantially circular shape formed by the respective divided pieces 12A to 12H is contracted in the radial direction via the inclined surfaces 16 and 18, whereby the structural components 10A to 10F of the crawler which are mounted at the outer periphery of the inner molds 22A and 22B are pressurized and vulcanized.

In the present embodiment, because the outer mold 12 is directly radially contracted by the outer frame 20, it becomes possible to reduce the number of frame components, press plates and the like.

Figure 7A:
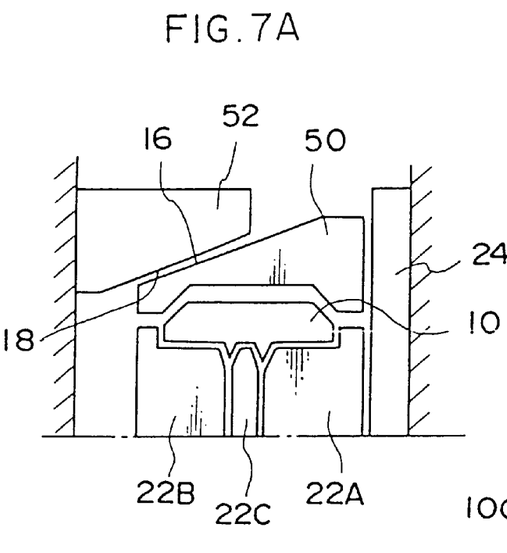
FIG. 7A is a schematic side sectional view.
Figure 7B:
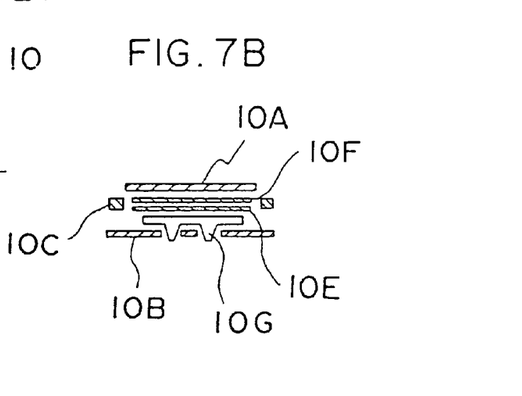
FIG. 7B is a layout view of structural components of a crawler.

FIGS. 7A and 7B illustrate a third embodiment of the crawler molding method of the present invention. In this embodiment, an outer frame 52 is directly provided on the outer periphery of an outer mold 50. Inner molds 22 are structured so as to be divided in three in the axial direction. In the present embodiment, it is also possible to structure the outer mold 50 separately by combining the outer mold 50 with the inner frame 14, as in the first embodiment.

Accordingly, in the present embodiment also, an inclined surface 16 is provided at the outer periphery of the outer mold 50, and an outer frame 52 is provided at the outer periphery side of the inclined surface 16. An inclined surface 18 which corresponds to the inclined surface 16 of the outer mold 50 is formed at the inner periphery of the outer frame 52. In accordance with a proximal movement of the press plate 24 in the axial direction toward the side of the outer frame 52, the outer mold 50 contracts in the radial direction, and the structural components of the crawler mounted on the outer periphery of the inner molds 22A, 22B and 22C are pressed and vulcanized. Here, the structural components of the crawler which are illustrated in FIG. 7B are a lug rubber 10A which forms a tracking portion, an inner periphery rubber 10B which forms an inner periphery, a side rubber 10C which forms a side rubber, a reinforcement bias cord 10F, a main cord 10E, and a guiding embedded metal 10G.

In the present embodiment, even in a case in which a crawler whose inner peripheral side has a complicated shape having projections and the like is vulcanized and molded, the release of the inner molds can be performed easily because the inner molds are divided into three and structured thereby.

Figure 8:
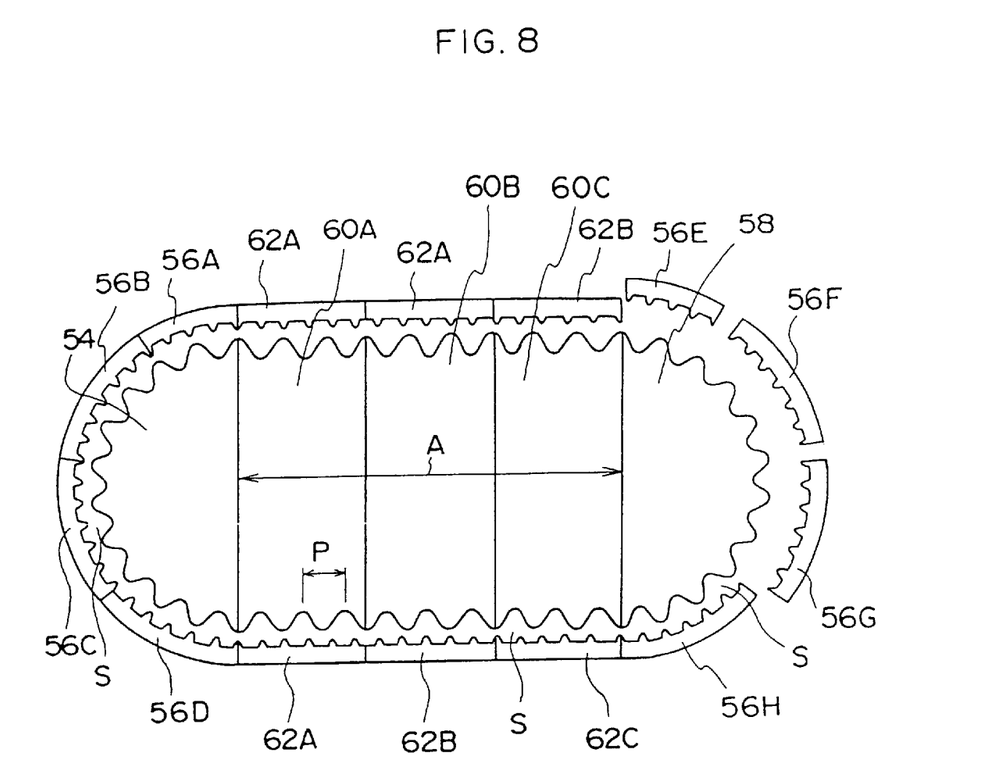
FIG. 8 is an explanatory view which illustrates a crawler molding method according to a fourth embodiment of the present invention.

Next, FIG. 8 illustrates a fourth embodiment of the crawler molding method of the present invention. The most distinctive feature of this embodiment is that a number of square inner and outer molds is selected and a selected plural number of square inner and outer molds are combined between inner and outer semi-circular molds in the peripheral direction of the crawler to form a mold, and structural components of a crawler are molded in the mold.

To explain in detail, a semi-circular inner mold 54 and semi-circular outer molds 56A, 56B, 56C and 56D are provided at a front portion of the mold (left portion of the drawing). The semi-circular outer molds 56A, 56B, 56C and 56D set apart from the semi-circular inner mold 54 to form a mold cavity space S for the crawler 10, are divided in the peripheral direction, and are slidable in the radial direction. A semi-circular inner mold 58 and semi-circular outer molds 56E, 56F, 56G and 56H are provided at a rear portion of the mold (right portion of the drawing). The semi-circular outer molds 56E, 56F, 56G and 56H set apart from the semi-circular inner mold 58 to form a mold cavity space S for the crawler 10, are divided in the peripheral direction, and are slidable in the radial direction. Further, between these, a number of inner and outer molds is selected (in the example illustrated in the drawing, it is three), and a selected plural number of square inner molds 60A, 60B and 60C, and outer molds 62A, 62B and 62C are provided. The outer molds 62A, 62B and 62C set apart from the square inner molds 60A, 60B and 60C to form a mold cavity space S for the crawler 10, are divided in the peripheral direction, and are slidable in the radial direction. In this manner, the inner and outer molds are structured.

Similar to the first embodiment, the front and rear semi-circular inner molds 54 and 58 and the square inner molds 60A, 60B and 60C which are provided between the front and rear semi-circular inner molds 54 and 58 are structured so as to be divided in the axial direction (the width direction of the crawler 10) and form left and right inner molds. That is, semi-circular inner molds and square inner molds which form pairs with the semi-circular inner molds 54 and 58 and the square inner molds 60A, 60B and 60C are provided, respectively, on the reverse side of the page of the drawing.

The square inner molds 60A, 60B and 60C, a number of which is selected and thereby provided (of course, the number of square molds not illustrated which form pairs is the same), are selected to the crawler peripheral direction length A=Pn/2 (P: crawler pitch, n=0, 1, 2, 3 . . . ). Here, pitch of the crawler 10 is defined as the interval between the embedded metal and driving sprocket holes which are provided at a position of the reinforcement cord which is ordinarily embedded in a substantial center of the thickness direction of the crawler.

Consequently, the number of square inner molds 60A, 60B and 60C is selected in accordance with the circumferential length of the crawler to be obtained. Therefore, it becomes possible to vulcanize and mold many types of crawlers having a variety of different circumferential lengths by using the front and rear semi-circular inner molds 58 and 54 just as they are. For example, when a number of square inner and outer molds which corresponds to A=P/2 is added, a crawler having a circumferential length which has become longer only by 1 pitch portion of the entire crawler can be obtained.

At the outer periphery of the front and rear semi-circular inner molds 54 and 58 and the square inner molds 60A, 60B and 60C which are provided between the front and rear semi-circular inner molds 54 and 58, after the structural components of the crawler such as those illustrated in FIG. 6B have been molded, the outer molds corresponding to these are radially contracted, and the structural components of the crawler are integrally vulcanized and molded to produce the crawler 10.

What is claimed is:

1. A crawler molding method, in which structural components of a crawler are placed between an outer mold and an inner mold to form an endless shape and vulcanized to integrally mold a crawler, comprising:

disposing the structural components of the crawler on an outer peripheral surface of the inner mold, which the inner mold is dividable in the axial direction of the crawler; and radially contracting and pressurizing toward the inner mold, by a radially contracting means, a diameter of a circle defined by a plurality of outer molds which are divided and disposed along the outer peripheral surface of the inner mold, whereby the structural components of the crawler are integrally vulcanized, wherein the radially contracting means is formed by on of:

an outer mold and a radially contractible inner frame formed on an outer peripheral side of the outer mold, the radially contractible inner frame having an inclined surface inclining in the width direction of the crawler and formed on an outer peripheral surface of the inner frame, the inner frame being movable in the axial direction and in the radial direction with respect to an inner peripheral inclined surface of an outer frame via the inclined surface: and an outer mold, the outer mold having an inclined surface inclining in the width direction of the crawler and formed on an outer peripheral surface of the outer mold, the outer mold being movable in the axial direction with respect to an inner peripheral inclined surface of an outer frame via the inclined surface; and the structural components of the crawler are integrally vulcanized by moving the outer frame in the width direction of the crawler to radially contract and pressurize the inner frame and the outer molds.

2. The crawler molding method according to claim 1, wherein a crawler molding space which is formed by an outer peripheral surface of the inner mold and an inner peripheral surface defined by the plurality of outer molds is circular from a side view.

3. The crawler molding method according to claim 1, wherein the inner mold is structured by two semi-circular inner molds and by a plurality of square inner molds which are disposed between the semi-circular inner molds and which allow the outer peripheral surfaces thereof to be continued; and the outer mold is structured by a plurality of circular arc-shaped outer molds to form a crawler molding space between the outer molds and the semi-circular inner molds, the crawler molding space being semi-circular from a side view, and by a plurality of square outer molds to form a linear crawler molding space between the outer molds and the square inner molds.

4. The crawler molding method according to claim 3, wherein a length of the square outer molds is determined by a crawler pitch which is an interval between one of driving sprocket holes of the crawler and embedded metals, and a number of square outer molds to be used is determined by a circumferential length of the crawler.

5. The crawler molding method according to claim 1, wherein a press plate for pressing the outer frame in the width direction of the crawler is provided.

6. The crawler molding method according to claim 1, wherein the radially contracting means structured by the inclined surfaces is formed on both end portions of the outer mold in the width direction and by an outer frame which is disposed on both sides of the outer mold and in which inclined surfaces which slide along the inclined surfaces formed on the both end portions of the outer mold is formed on an inner peripheral portion of the outer frame, and the outer frame is moved toward the outer mold from the both sides, so that the outer mold is radially contracted and pressurized to integrally vulcanize the structural components of the crawler.

7. The crawler molding method according to claim 1, wherein at the time that the inner mold is divided in the axial direction of the crawler and the crawler is released, an outer peripheral portion of the crawler is gripped by a gripping means.

8. The crawler molding method according to claim 7, wherein the gripping means is a gripping member which is driven by a gripping cylinder and which grips an outer peripheral portion of the crawler between the inner mold and the gripping member.

9. The crawler molding method according to claim 1, wherein the inner mold is rotated, and a reinforcement cord which is fed from a wire feeder to an outer peripheral surface of the inner mold is wound.

10. The crawler molding method according to claim 9, wherein the inner mold is mounted on a mold chuck which is rotatably driven by a motor.

11. The crawler molding method according to claim 1, wherein the inner mold is mounted on a mold release driver which moves relative to rails.

12. The crawler molding method according to claim 11, wherein the mold release driver is driven by a cylinder.

13. The crawler molding method according to claim 9, wherein reinforcing wires are coiled as a single reinforcement cord in a spiral configuration to an embedding site on the crawler at a predetermined pitch while being twisted together from the wire feeder.

14. The crawler molding method according to claim 9, wherein the reinforcement cord formed by the wires which have been twisted together in advance is fed from the wire feeder in a spiral configuration.

15. The crawler molding method according to claim 9, wherein the reinforcement cord which has been coated with rubber is fed from the wire feeder in a spiral configuration.

16. The crawler molding method according to claim 9, wherein a canvas-configured body, in which a plurality of reinforcing cords is mounted in one of a row and at an incline at a predetermined bias angle, is fed from the wire feeder.

17. The crawler molding method according to claim 1, wherein the inner mold is divided in three at a center and both sides of the center.

18. The crawler molding method according to claim 1, wherein a tread pattern of a tracking surface of the crawler is defined by an inner peripheral surface of the outer molds.

19. The crawler molding method according to claim 1, wherein the inner mold and the outer mold are heated as heating plates.

* * * * *